(12) United States Patent
Lim et al.

(10) Patent No.: US 6,269,218 B1
(45) Date of Patent: Jul. 31, 2001

(54) DATA REPRODUCING APPARATUS AND METHOD BASED ON DISPLAY TYPE INFORMATION RECORDED ONTO DATA RECORDING MEDIUM

(75) Inventors: Gun Hwa Lim; Hyun Mok Kim, both of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/086,488

(22) Filed: May 29, 1998

(30) Foreign Application Priority Data

May 29, 1997 (KR) ................................. 97/21540

(51) Int. Cl.⁷ ........................................ H04N 5/76
(52) U.S. Cl. ................. 386/46; 386/95; 386/131
(58) Field of Search ........................ 386/46, 95, 111, 386/112, 125, 126, 13, 131; H04N 5/76

(56) References Cited

U.S. PATENT DOCUMENTS 5,619,338 * 4/1997 Nakai et al. ................... 386/126
5,651,087 * 7/1997 Nagano et al. ................. 386/126
5,712,950 * 1/1998 Cookson et al. ................ 386/105
6,028,979 * 2/2000 Hirayama et al. ................ 386/95

* cited by examiner

Primary Examiner—Huy Nguyen

(57) ABSTRACT

An optical disk data reproducing method reproduces data in accordance with characteristics of a track and a recording system thereof when scanning or randomly accessing a video CD which has a plurality of tracks. The data reproducing method performs a reproducing operation by reading information in a sequence header which exists in a first end of each track whenever a track is changed. Further, when scanning or randomly accessing an optical disk wherein PAL and NTSC bit streams exist, if a broadcasting system is changed, the method of the present invention holds a present reproduction location and reads a sequence header of a first end of a corresponding track, for thereby newly setting up parameters, returning to the reproduction location which has been held and performing the reproducing operation therefrom.

10 Claims, 5 Drawing Sheets

DATA REPRODUCING APPARATUS AND METHOD BASED ON DISPLAY TYPE INFORMATION RECORDED ONTO DATA RECORDING MEDIUM

BACKGROUND OF THE INVENTION

1. Field of the Invention

The present invention relates to an optical disk data reproducing method, and more particularly to an optical disk data reproducing method by which a reproducing operation is performed in accordance with track characteristics and recording system.

2. Discussion of the Background

Currently, recording media are mainly divided into magnetic disks and optical disks, and particularly the optical disks are in great demand due to its massive information storage capacity.

FIG. 1 illustrates a typical optical disk of which a radius L1 is 60 mm and a diameter of a center hall L2 is 15 mm. The optical disk has a main storage area (MSA), including a lead-in area and a lead-out area, and an outer area.

As shown in FIG. 4, the lead-in area includes a table of contents (TOC) which shows location information of a track or a recording system of an MPEG bit stream, and a data track of MSA includes a plurality of tracks (track 1, track 2, . . . , track N).

FIG. 2 is a schematic block diagram of a disk data reproducing device for the optical disk of FIG. 1.

As shown therein, the optical disk reproducing device includes an optical pickup 11 recording/reproducing data in an optical disk 10, a high-frequency amplifier 12 amplifying a reproduction signal outputted from the optical pickup 11, a digital signal processor (DSP) 13 digitalizing the amplified signal supplied from the high-frequency amplifier 12, and performing demodulation and error-correction of the signal, an MPEG decoder 14 decoding the signal outputted from DSP 13 a D/A converting unit 15 converting the signal outputted from the MPEG decoder 14 to an analog signal and outputting audio and video signals, an MPEG microcomputer 16 analyzing/judging the signal from the MPEG decoder 14, a microprocessor 17 performing a general control operation, a servo unit 18 performing a servo operation in accordance with control of the microprocessor 17, a memory 19 storing information which have been processed in the microprocessor 17, a display unit 20 displaying data, and a key input unit 21 receiving a key input signal from a user.

Now, the operation of the conventional optical disk data reproducing device will be described in detail with reference to FIGS. 2 and 3.

First, when a user reproduction instruction is supplied to the key input unit 21 after power is applied, the microprocessor 17 shifts the pickup 11 to the innermost part of the optical disk 10 and controls the servo unit 18, thereby performing focusing control and tracking control (S101, S103). When the pickup 11 is positioned on the innermost part of the disk 10, the microprocessor 17 controls the pickup 11 to move outward and determine whether the pickup 11 has reached the lead-in area of the MSA. (S105).

When the pickup 11 is in the lead-in area of MSA, the microprocessor 17 reads the TOC in the lead-in area (S107), and receives the TOC data which are passed through the high frequency amplifier 12, to determine if the MPEG data recorded in the track is NTSC or PAL based.

After recognizing the type of the MPEG data, the microprocessor 17 checks whether a reproduction location designating key has been inputted (S109). If the reproduction key is inputted, the microprocessor 17 shifts the pickup 11 to the designated position and reproduces an MPEG bit stream therefrom (S111). If not the microprocessor 17, reproduces the MPEG bit stream from the first end of the corresponding track (S113).

Next, when any reproduction location changing key is inputted over the key input unit 21 during the reproducing operation (S115), the microprocessor 17 shifts the pickup 11 to the location corresponding to the inputted reproduction location changing key and reproduces the MPEG bit stream from the changed track location (S117), and when the reproducing operation is completed or a reproduction interruption key is supplied from the user, the microprocessor 17 completes the reducing operation (S119).

The reproduced MPEG bit stream is amplified in the high-frequency amplifier 12, then the amplified MPEG bit stream is demodulated and error is corrected in the DSP 13 and the resultant bit stream is inputted to the MPEG decoder 14. The MPEG decoder 14 decodes the MPEG bit stream from the DSP 13 in accordance with parameters stored in the memory 21 and outputs the decoded MPEG bit stream to the D/A converting unit 15 and the microprocessor 17.

Thereafter, the D/A converting unit 15 converts the output signal from the MPEG decoder 14 to the analog signal and outputs the audio and video signals, and the MPEG microcomputer 16 analyzes/judges the output signal from the MPEG decoder 14 and outputs the result to the microprocessor 17, which processes various control operations on the basis of the output data from the MPEG microcomputer 16, and the process result thereof is stored in the memory 19 and also displayed on the display unit 20.

However, the conventional optical disk data reproducing method has a problem that video or audio data may not be normally reproduced when data of an optical disc in which information of the NTSC system and the PAL system coexist are reproduced by a scan or a random access or when characteristics of a present track are different from that of the previous track thereof, because the conventional optical disk data reproducing method uses information with respect to an NTSC or a PAL system until the completion time of the data reproducing operation without any change in the situation which either of the NTSC or PAL system is applied for recording data in an optical disk.

For example, when reproducing data of a track in which an NTSC bit stream is recorded by the scan or random access while data in the track in which a PAL bit stream is recorded are being reproduced, lower and upper parts of a picture may be cut off or the picture may be cracked.

Further, a hold in the picture may be occurred due to frame rate difference between the NTSC system and the PAL system.

SUMMARY OF THE INVENTION

Accordingly, the present invention is directed to an optical disk data reproducing method that obviates the problems due to limitations and disadvantages of the related art.

An object of the present invention is to provide an optical disk data reproducing method that reproduces data in accordance with characteristics of tracks and a recording system by scanning or randomly accessing a video CD which has a plurality of tracks, thereby obtaining reliability of a data reproducing operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in an optical disk data reproducing device for reproducing video and audio data of a video CD which has a plurality of tracks by a scan or a random access, an optical disk data reproducing method includes a first step for sensing a key input and judging whether the key input is for the scan or the random access, a second step for checking whether a track is changed, when the key input has been judged for the scan or the random access in the first step, a third step for reading a value of a sequence header in a reproduced bit stream and comparing the sequence header value with a sequence header value of a previous track, when the track is changed to another track, and a fourth step for newly setting up a sequence header value and parameters required for a decoding process when the compared sequence header value and sequence header value of the previous track value are not identical and performing scan and random access operations.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
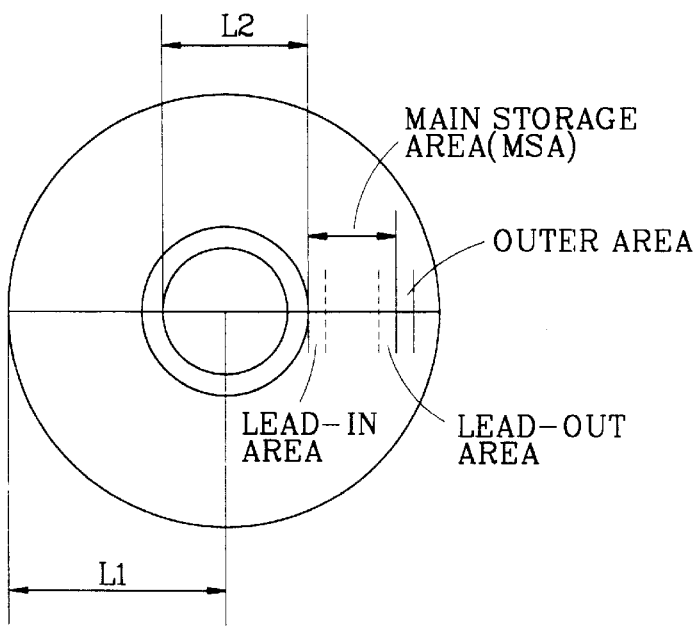
FIG. 1 is a schematic diagram of a general optical disk.
Figure 2:
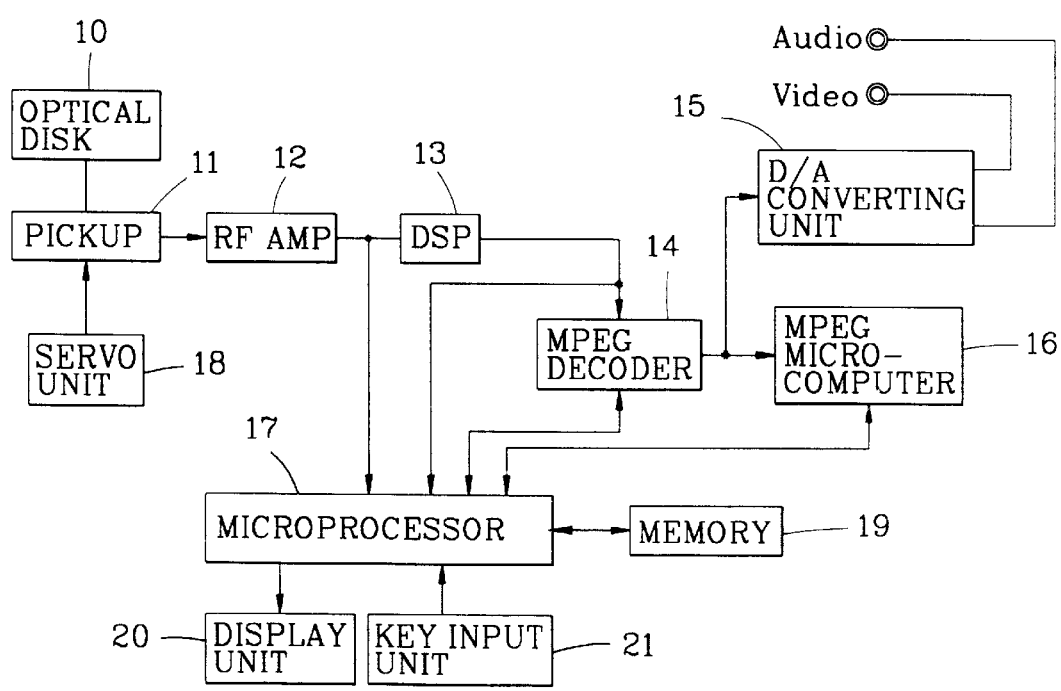
FIG. 2 is a block diagram of a data reproducing device for the optical disk of FIG. 1.
Figure 3:
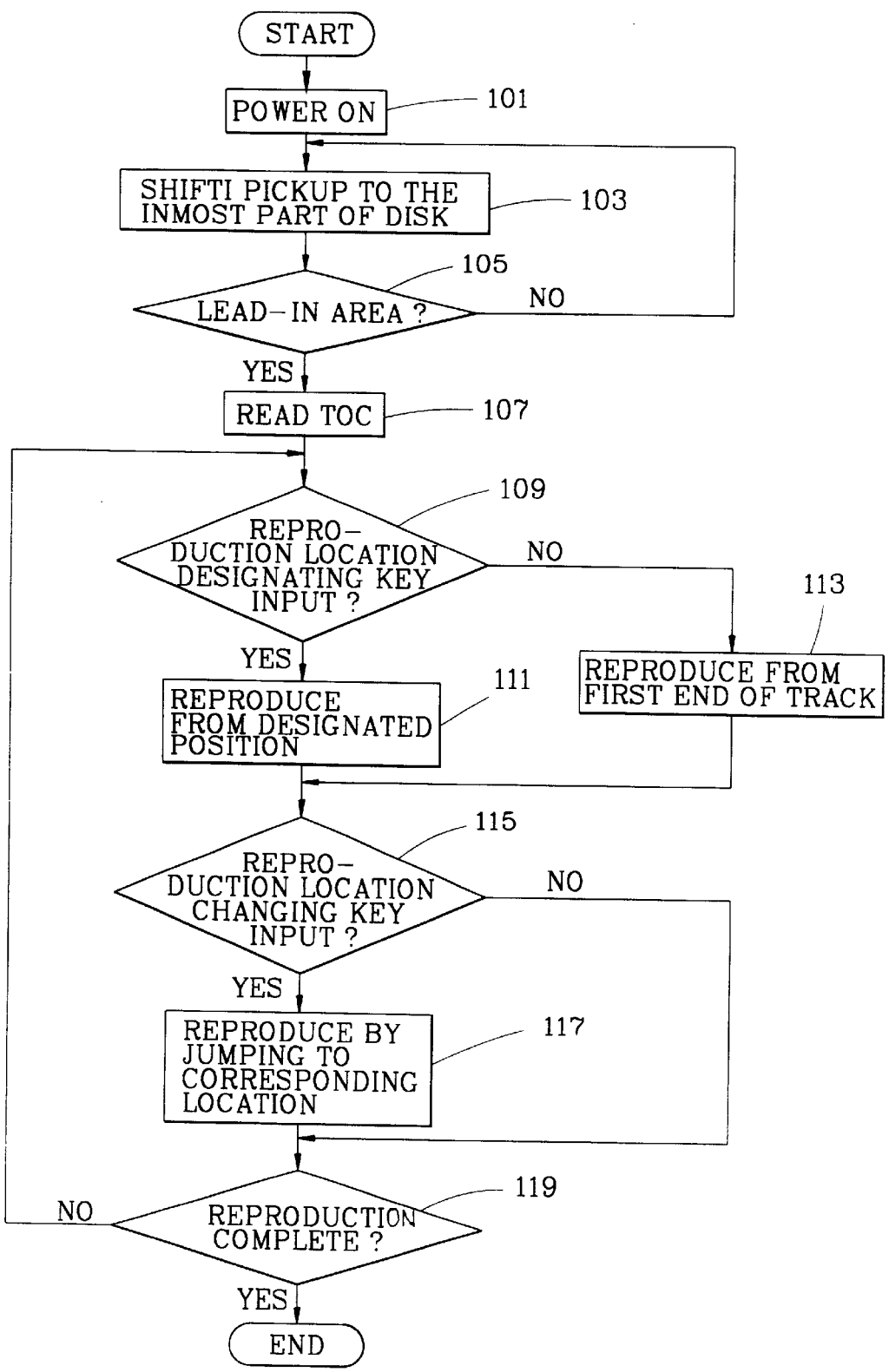
FIG. 3 is a flowchart of a conventional optical disk data reproducing method.
Figure 4:
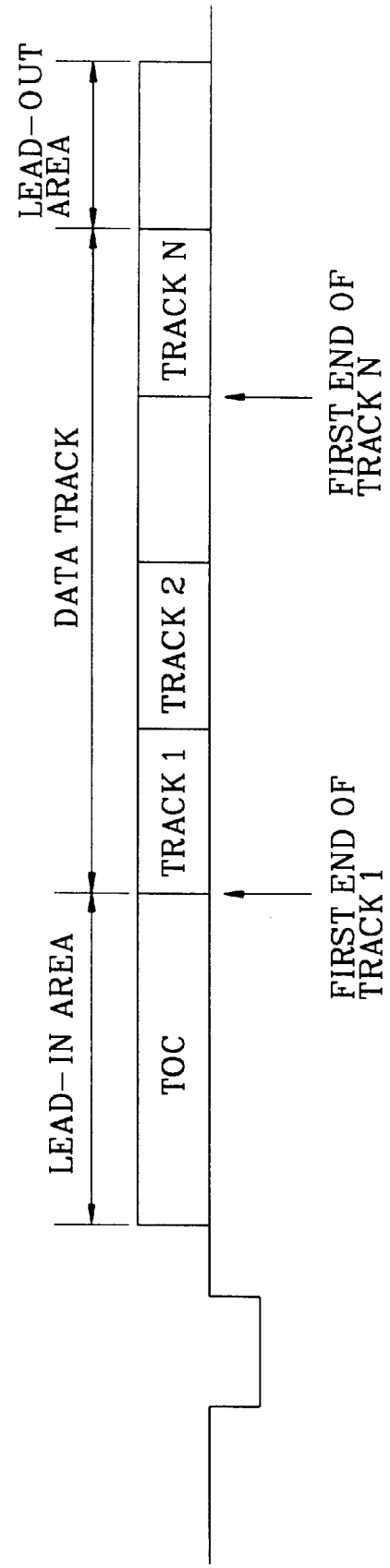
FIG. 4 is a diagram illustrating a general data format of the optical disk in FIG. 1.

According to video CD standards, there exists at least one sequence header in a front part of a track. The sequence header is an area which has important characteristic information for decoding a bit stream outputted from the DSP 13 in FIG. 2, such as horizontal-size, vertical-size, pel-aspect-ratio, picture-rate, bit-rate, vbr-buffer-size and a quantized table, etc;

Here, sequence header values are identical in a single track, however in a plurality of tracks (maximum 99 tracks) sequence header values among the tracks may be different from each other.

Figure 5:
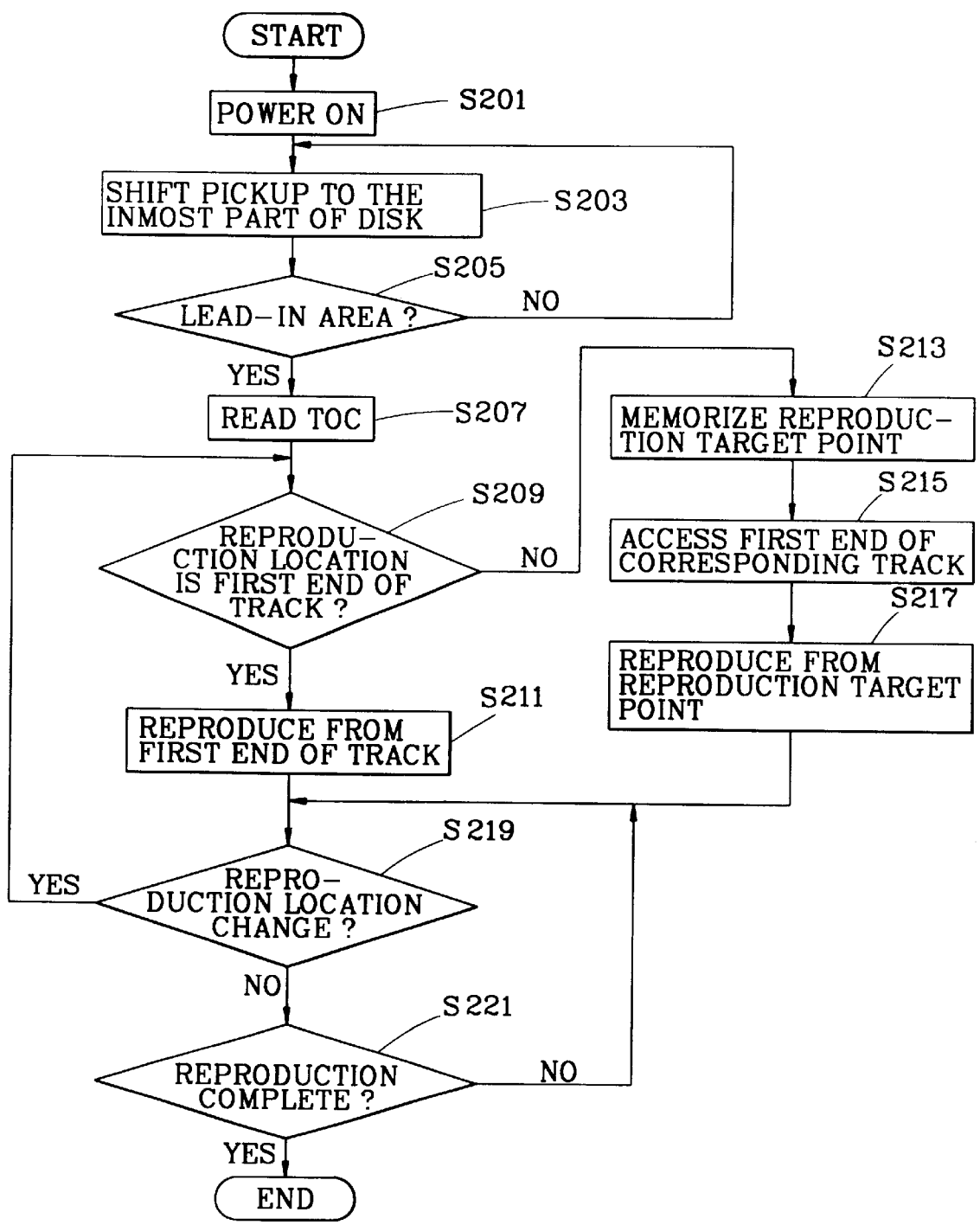
FIG. 5 is a flowchart of an optical disk data reproducing method according to a first embodiment of the present invention.

FIG. 5 illustrates an optical disk data reproducing method according a first embodiment of the present invention in a flowchart form.

When a user reproduction instruction is inputted through the key input unit 21, the microprocessor 17 shifts the pickup 11 to the inmost part of the optical disk 10 and controls the servo unit 18, thereby performing the focusing control and tracking control operations (S201, S203).

When the pickup 11 reaches the inmost part of the optical disk 10, the microprocessor 17 moves the pickup 11 in an outward direction of the disk until the pickup 11 reaches the lead-in area (S205), and distinguishes track location information (time information) by receiving TOC information in the lead-in area through the high-frequency amplifier 12 (S207).

When a reproduction location is designated and outputted from the key input unit 21, the microprocessor 17 reproduces data from the first end of a corresponding track location, if the reproduction location is the first end thereof (S209, S211). If the designated location is not the first end, the microprocessor 17 stores a reproduction target point (S213), and shifts the pickup 11 to a first end of a corresponding track, thereby storing characteristic information of the corresponding track in the memory 19, read from the sequence header thereof.

Next, the microprocessor 17 performs the reproducing operation from the stored reproduction target point (S217), The microprocessor 17 then senses an output signal from the key input unit 21, for determining whether the reproduction location has been changed (S219). If there has been a change of the data reproduction location, the microprocessor repeats the operations after step S209. If there is no change, the microprocessor completes the data reproduction operation (S221).

In the above-described reproducing operation, the MPEG stream is amplified by the high frequency amplifier 12, demodulation and error-correction are performed on the amplified signal in the DSP 13, and the resultant signal is inputted the decoder 14. The MPEG decoder 14 decodes the bit stream outputted from the DSP 13 in accordance with the characteristic information and parameters that are stored in the memory 19, and the D/A converting unit 15 converts the signal from the DSP 13 to an analog signal, for thereby outputting audio and video signals.

The MPEG microcomputer 16 analyzes/distinguishes the signal supplied from the MPEG decoder 14 and outputs to the microprocessor 17, which in turn processes various control operations in accordance with the output signal from the MPEG microcomputer 16, and the processed results therefrom are stored in the memory 19 and displayed on the display unit 20.

Thus, to perform the data reproducing operation, the method according to the first embodiment reads the information of the sequence header which exists in the first end of the corresponding track whenever a track change occurs, for preventing any error due to the change of the characteristics of the track, and being capable of reproducing data matching the characteristics of each corresponding track.

Figure 6:
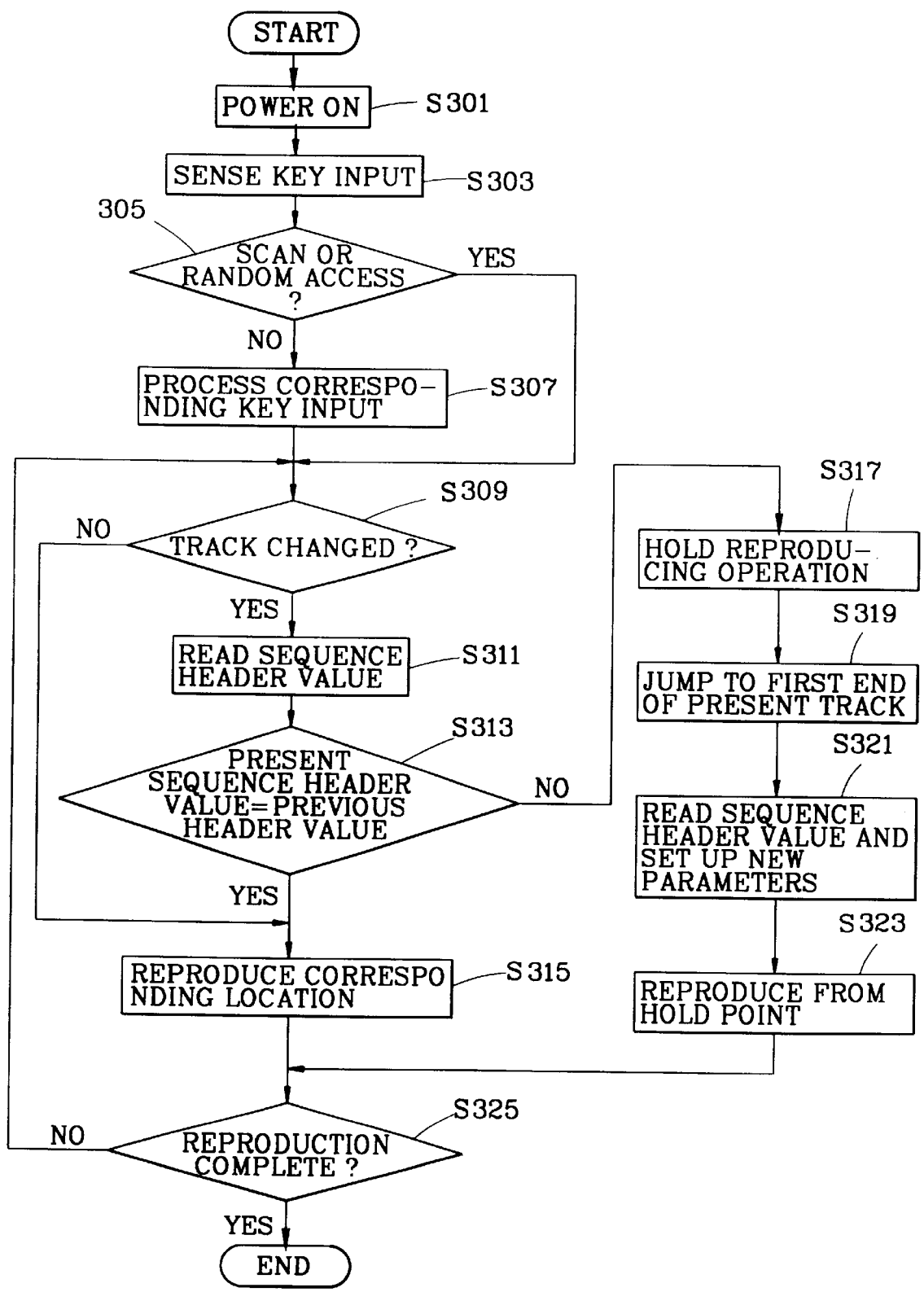
FIG. 6 is a flowchart of an optical disk data reproducing method according to a second embodiment of the present invention.

FIG. 6 is a flowchart of an optical disk data reproducing method according a second embodiment of the present invention.

When power is applied, the microprocessor 17 senses a key input through the key input unit 21 and determines whether the key input is a scan or a random access (S301, S303, S305) instruction. If the key input is neither scan nor random access, the microprocessor 17 processes the corresponding key input (S307), and if the key input is the scan or random access, checks whether any track change has occurred (S309). Here, to detect the a change of the track, the microprocessor detects a track number of a sub-Q code or a file number (a track number–1=a file number) of a sub-header of an MPEG bit stream. If the detected file number or track number is different from a previous value, the microprocessor 17 determines that the track has been changed.

If the track has been changed, the microprocessor 17 reads vertical-size and picture-rate stored in the sequence header of the MPEG bit stream which is outputted from the DSP 13 (S311), and compares a present sequence head value and a previous sequence head value by comparing the presently detected vertical-size and picture-rate with the vertical-size and picture-rate which were detected in the previous track (S313).

Here, if the two sequence header values are the same, the microprocessor 17 determines that the current and the previous sequence header value are identical and reproduction data from the corresponding location (S315), and if the two sequence header values are different, the microprocessor 17 determines that the current sequence header value has changed and holds a present reproduction location (S317).

Next, the microprocessor 17 reads a correct sequence header value by shifting the pickup 11 from location information (time information) which are read in TOC of the lead-in area to the first end of the present track, and sets up new parameters for a decoding process (S319, S321). Next, the microprocessor 17 stores the above resultant information in the memory 19 and performs the data reproducing operation from the location which has been held in S317 until the data reproduction operation is completed (S323, S325).

According to the methods of the present invention, data of a track can be reproduced without any error, even though tracks maybe contained mixed data such as PAL or NTSC.

Specifically, when a plurality of tracks have PAL system data and NTSC system data, the microprocessor 17 reads vertical-size in a sequence header of an MPEG bit stream. If the vertical-size is 288 Pels, the microprocessor 17 determines that it is the PAL bit stream system, if the vertical-size is 240 Pels, it is considered to be the NTSC bit stream system. Accordingly, when it is required to reproduce data in a track recorded in the NTSC bit stream system by the scan or the random access or required to reproduce data in a track recorded in the PAL bit stream system, the reproducing operations can be performed according to the above-described operation.

Further, in the second embodiment, since the parameters are set up again in accordance with the information of the sequence header of the identical system, when scanning or randomly accessing the optical disk in which the PAL and NTSC bit streams exist together, the present invention has an effect of reproducing the video and audio signals without any error.

As described above, in the optical disk having the plurality of tracks, the optical disk data reproducing method of the present invention reproduces data of each track in accordance with the characteristics of the corresponding track and the recording system thereof, thus obtaining the reliability of video and audio data reproduction.

It will be apparent to those skilled in the art that various modifications and variations can be made in the optical disk data reproducing method of the present invention without departing from the spirit or scope of the invention. Thus, it is intended that the present invention cover the modifications and variations of this invention provided they come within the scope of the appended claims and their equivalents.

What is claimed is:

1. A method for reproducing data recorded on a data recording medium comprising:

receiving a command signal for reproducing data at a current location of said data recording medium;

recognizing a current display format of data reproduced from said current location of said data recording medium;

comparing a previous display format for data reproduced from a previous location with said current display format of data from said current location; and setting a parameter for displaying said data reproduced from said current location of said data recording medium according to said current display format.

2. The method according to claim 1, wherein said current display format is one of PAL and NTSC.

3. The method according to claim 1, wherein said current display format is recorded on said current location of said data recording medium.

4. The method according to claim 1, wherein said parameter for displaying said data further comprises a parameter for decoding the reproducing said data.

5. The method according to claim 1, wherein said recognizing step further comprises searching for a beginning of a header of a track corresponding to said current location, if said current location is not said beginning of said header.

6. An apparatus for reproducing data recorded on a data recording medium comprising:

a command signal detector for reproducing data at a current location of said data recording medium;

a characteristics information recognizer for recognizing a current display format of data reproduced from said current location of said data recording medium comparing a previous display format for data reproduced from a previous location with said current display format of data from said current location; and a controller for setting a parameter for displaying said data reproduced from said current location of said data recording medium according to said current display format.

7. The apparatus according to claim 6, wherein said current display format is one of PAL and NTSC.

8. The apparatus according to claim 6, wherein said current display format is recorded on said current location of said data recording medium.

9. The apparatus according to claim 6, wherein said parameter for displaying said data further comprises a parameter for decoding the reproducing said data.

10. The apparatus according to claim 6, wherein said characteristics information recognizing means further comprises a searcher searching for a beginning of a header of a track corresponding to said current location, if said current location is not said beginning of said header.

* * * * *